(12) United States Patent
Britto Mattos Lima et al.

(10) Patent No.: US 11,228,544 B2
(45) Date of Patent: Jan. 18, 2022

(54) ADAPTING COMMUNICATIONS ACCORDING TO AUDIENCE PROFILE FROM SOCIAL MEDIA

(71) Applicant: International Business Machines Corporation, Armonk, NY (US)

(72) Inventors: Andrea Britto Mattos Lima, São Paulo (BR); Carlos Henrique Cardonha, São Paulo (BR); Marisa Affonso Vasconcelos, São Paulo (BR); Miguel Paredes Quinones, São Paulo (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/737,997

(22) Filed: Jan. 9, 2020

(65) Prior Publication Data
US 2021/0218695 A1 Jul. 15, 2021

(51) Int. Cl.
*H04L 12/58* (2006.01)
*H04L 29/08* (2006.01)
*G06Q 50/00* (2012.01)
*G06F 16/9035* (2019.01)

(52) U.S. Cl.
CPC ........ *H04L 51/063* (2013.01); *G06F 16/9035* (2019.01); *G06Q 50/01* (2013.01); *H04L 51/14* (2013.01); *H04L 51/26* (2013.01); *H04L 51/32* (2013.01); *H04L 67/306* (2013.01)

(58) Field of Classification Search
CPC ....... H04L 51/063; H04L 51/14; H04L 51/26; H04L 51/32; H04L 67/306; G06Q 50/04; G06F 16/9035

USPC .......................................................... 709/206
See application file for complete search history.

(56) References Cited

U.S. PATENT DOCUMENTS

| 5,515,490 | A | 5/1996 | Buchanan et al. |
| 6,336,072 | B1 | 1/2002 | Takayama et al. |
| 7,114,170 | B2 | 9/2006 | Harris et al. |
| 8,543,454 | B2 | 9/2013 | Fleischman et al. |
| 10,282,409 | B2 | 5/2019 | Allen et al. |

(Continued)

FOREIGN PATENT DOCUMENTS

CN 1478239 A 2/2004

OTHER PUBLICATIONS

Whova, "Award-winning Event Apps and Event Management Software," https://whova.com/, 16 pages, retrieved Oct. 7, 2019.

*Primary Examiner* — Frantz B Jean
(74) *Attorney, Agent, or Firm* — Cantor Colburn LLP; Joseph Petrokaitis

(57) ABSTRACT

Techniques relate to adapting communications. A computer system receives initial content and event constraints related to a to-be-delivered communication and extracts information for recipients designated to receive the to-be-delivered communication. The computer system determines content utility values for topics of the initial content for each of the recipients, the content utility values for each of the topics being based on the information for each of the recipients. The computer system determines total content utility values for each of the topics in the initial content and selects elements of the to-be-delivered communication from a database based at least in part on the total content utility values for the topics and the event constraints.

20 Claims, 6 Drawing Sheets

(56) References Cited

U.S. PATENT DOCUMENTS

| | | | |
|---|---|---|---|
| 2002/0177115 A1 | 11/2002 | Moskowitz et al. | |
| 2003/0222890 A1 | 12/2003 | Salesin et al. | |
| 2004/0194123 A1 | 9/2004 | Fredlund et al. | |
| 2006/0020895 A1 | 1/2006 | Keohane et al. | |
| 2008/0040340 A1 | 2/2008 | Varadarajan et al. | |
| 2009/0138332 A1 | 5/2009 | Kanevsky et al. | |
| 2010/0004977 A1 | 1/2010 | Marci et al. | |
| 2010/0161541 A1 | 6/2010 | Covannon et al. | |
| 2010/0205541 A1* | 8/2010 | Rapaport | G06F 16/285 |
| | | | 715/753 |
| 2011/0022967 A1 | 1/2011 | Vijayakumar et al. | |
| 2011/0197224 A1 | 8/2011 | Meijer | |
| 2011/0211764 A1 | 9/2011 | Krupka et al. | |
| 2011/0270923 A1 | 11/2011 | Jones et al. | |
| 2012/0042263 A1* | 2/2012 | Rapaport | G06Q 50/01 |
| | | | 715/753 |
| 2012/0290950 A1* | 11/2012 | Rapaport | H04N 21/8358 |
| | | | 715/753 |
| 2013/0013601 A1 | 1/2013 | Kabiljo et al. | |
| 2013/0159110 A1 | 6/2013 | Rajaram et al. | |
| 2013/0238370 A1 | 9/2013 | Wiseman et al. | |
| 2013/0325704 A1 | 12/2013 | Gorman et al. | |
| 2013/0332525 A1 | 12/2013 | Liu et al. | |
| 2014/0010520 A1 | 1/2014 | Bhatia et al. | |
| 2014/0129331 A1* | 5/2014 | Spivack | G06Q 30/0255 |
| | | | 705/14.53 |
| 2014/0229866 A1 | 8/2014 | Gottlieb | |
| 2014/0344360 A1* | 11/2014 | Bank | G06Q 50/01 |
| | | | 709/204 |
| 2015/0081734 A1 | 3/2015 | Mason | |
| 2015/0088622 A1 | 3/2015 | Ganschow | |
| 2015/0150031 A1 | 5/2015 | Gibbon et al. | |
| 2015/0193089 A1 | 7/2015 | Berlin et al. | |
| 2015/0278691 A1* | 10/2015 | Xia | G06F 16/90344 |
| | | | 706/11 |
| 2016/0011729 A1 | 1/2016 | Flores et al. | |
| 2016/0253710 A1* | 9/2016 | Publicover | G06F 16/2358 |
| | | | 705/14.66 |
| 2016/0359994 A1* | 12/2016 | Liu | H04W 4/02 |
| 2016/0364651 A1* | 12/2016 | Flinn | G06Q 50/01 |
| 2017/0178184 A1* | 6/2017 | Brill | G06Q 30/0277 |
| 2018/0188916 A1* | 7/2018 | Lyons | H04N 21/23418 |
| 2018/0316635 A1* | 11/2018 | Chiu | H04L 67/306 |
| 2019/0034536 A1* | 1/2019 | Papp | G06Q 50/01 |
| 2019/0164130 A1* | 5/2019 | Marci | G06Q 30/0201 |
| 2020/0349610 A1* | 11/2020 | Publicover | G06F 16/2358 |
| 2021/0224858 A1* | 7/2021 | Khoury | G06Q 30/0246 |

* cited by examiner

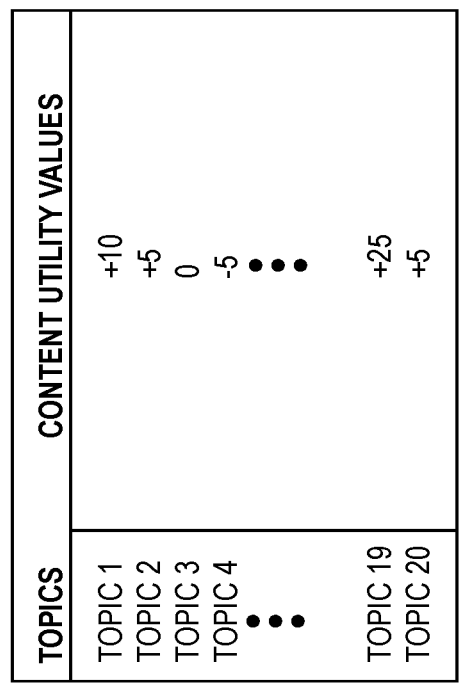

FIG. 4B 450

| TOPICS | TOTAL CONTENT UTILITY VALUES |
|---|---|
| TOPIC 1 | +50 |
| TOPIC 2 | +75 |
| TOPIC 3 | +25 |
| TOPIC 4 | 0 |
| ••• | ••• |
| TOPIC 19 | -10 |
| TOPIC 20 | +60 |

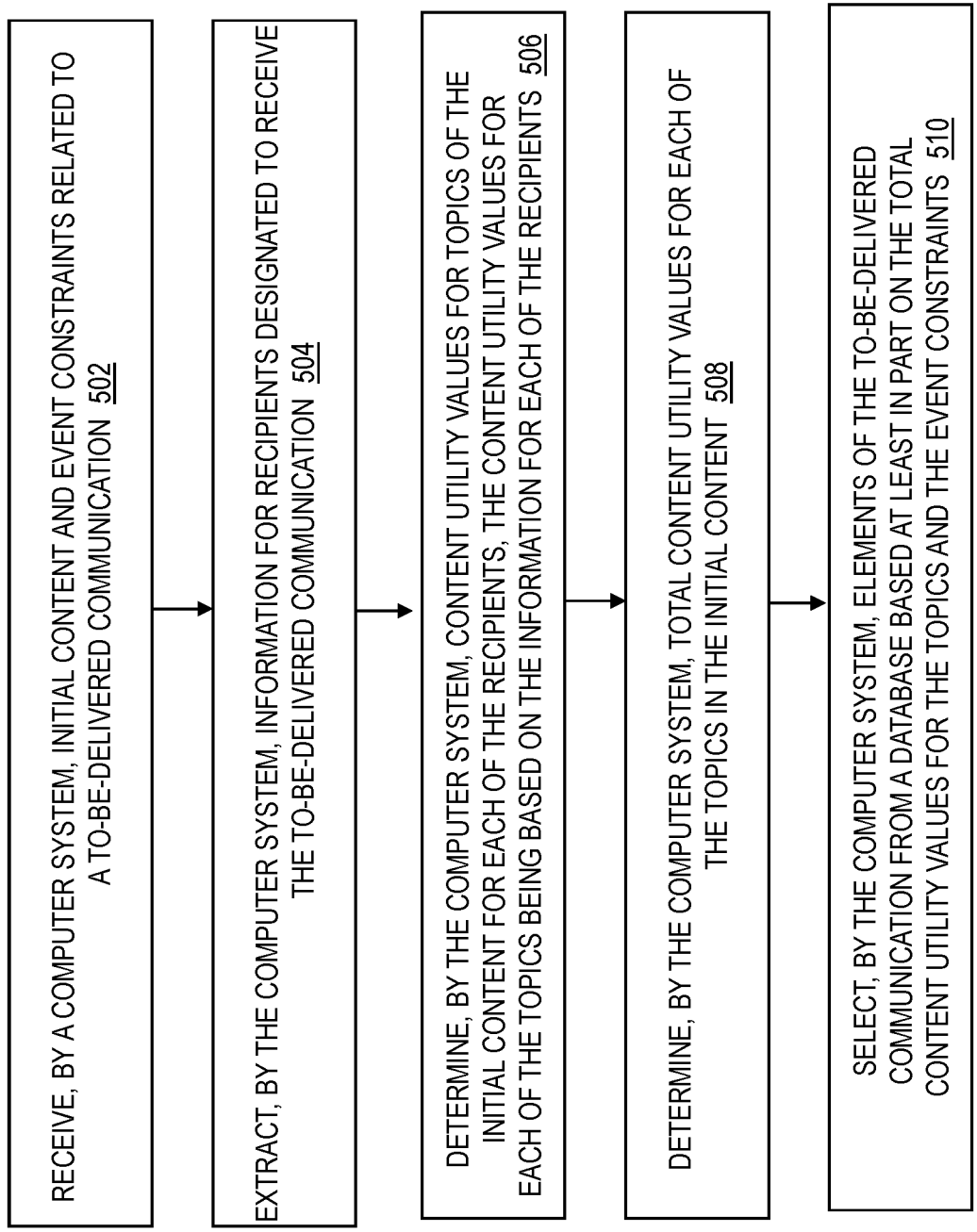

ADAPTING COMMUNICATIONS ACCORDING TO AUDIENCE PROFILE FROM SOCIAL MEDIA

BACKGROUND

The present invention generally relates to computer systems, and more specifically, to adapting the content of a communication according to audience profiles from social media.

In recent years, social networking systems have made it easier for users to share their interests and preferences in a variety of areas, such as their favorite movies, musicians, celebrities, brands, hobbies, sports teams, and activities. These interests can be expressed by users in their user profiles and can also be inferred by social networking systems.

SUMMARY

Embodiments of the present invention are directed adapting content of a communication according to audience profiles from social media. A non-limiting example computer-implemented method includes receiving, by a computer system, initial content and event constraints related to a to-be-delivered communication, and extracting, by the computer system, information for recipients designated to receive the to-be-delivered communication. The computer-implemented method includes determining, by the computer system, content utility values for topics of the initial content for each of the recipients, the content utility values for each of the topics being based on the information for each of the recipients. Also, the computer-implemented method includes determining, by the computer system, total content utility values for each of the topics in the initial content and selecting, by the computer system, elements of the to-be-delivered communication from a database based at least in part on the total content utility values for the topics and the event constraints.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4A is a block diagram of an example content utility list of topics and corresponding content utility values per topic in accordance with one or more embodiments of the present invention;

FIG. 4B is a block diagram of an example total content utility list of topics and corresponding total content utility values per topic for all attendees in accordance with one or more embodiments of the present invention; and FIG. 5 is a flow diagram of a computer-implemented method for selecting electronic slides for and/or generating an electronic presentation in accordance with one or more embodiments of the present invention.

DETAILED DESCRIPTION

One or more embodiments of the present invention provide techniques for adapting a communication according to audience profiles from social media prior to presenting the communication to one or more members of the audience. The communication can take a variety of forms, including, for example, informational content presented to an audience. The informational content of the communication can include audio, video, written text, sensory items (e.g., samples of an item that audience members can hold), and the like. In example embodiments of the invention described herein, the communication is in the form of an electronic presentation, which can include any of the above-described forms of informational content. One or more embodiments of the invention are configured to recommend content for the electronic presentation and/or create the electronic presentation using material from a shared database while taking into account inferred audience profiles. When recommending content for creating the electronic presentation on a computer system, the computer system can be configured to take into account at least the following concerns/factors: the electronic presentation should be consistent; content should be appealing for people in the audience; and individuals in the audience should have some of their personal preferences presented to some extent in the electronic presentation.

A challenge faced by individuals making presentations to general audiences is to select content that fosters engagement and improves the experience of the audience. For example, the content of the presentation should be tailored such that it can be adequately communicated within the time limitations of the event, and the content should be further tailored based on an estimation of utility that the members of the audience assign to the content. Additionally, it would be beneficial to facilitate the re-use of content for a large enterprise, thus avoiding re-work and wasted productivity. There are currently no known tools to effectively assist with these goals.

One or more embodiments of the present invention provide technical solutions to one or more of these disadvantages of existing solutions by providing a computer-based system and computer-implemented methods configured and arranged to support presenters during the selection of content of a presentation that will be delivered to a given audience. In particular, one or more embodiments of the invention can recommend suitable content (e.g., slides) for the electronic presentation by extracting relevant material from a shared database of existing presentation materials (e.g., slide decks) while taking into account content from audience social media profiles and target business goals of the presentation content (e.g., a desired business-related goal).

Figure 1:
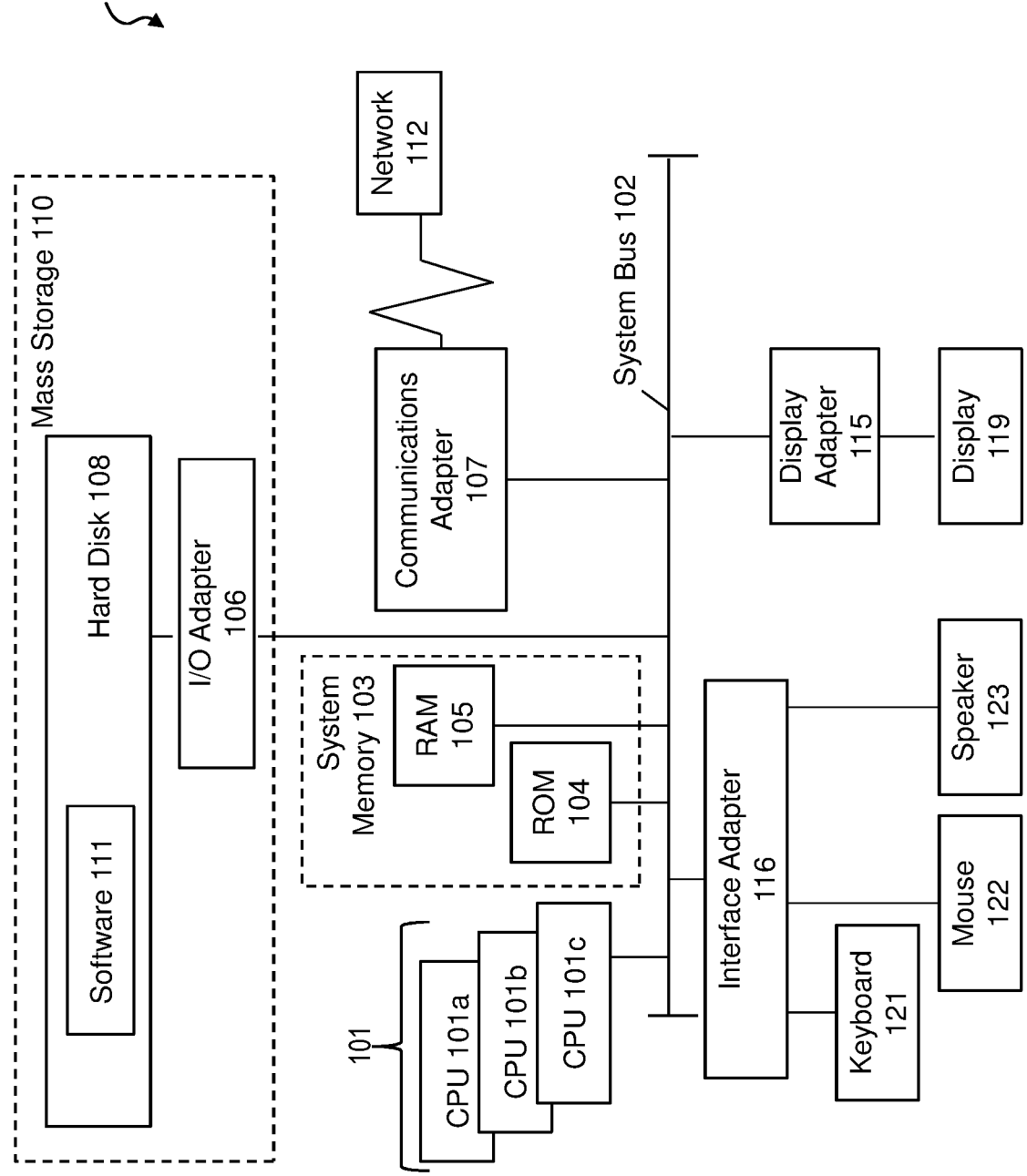
FIG. 1 is a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
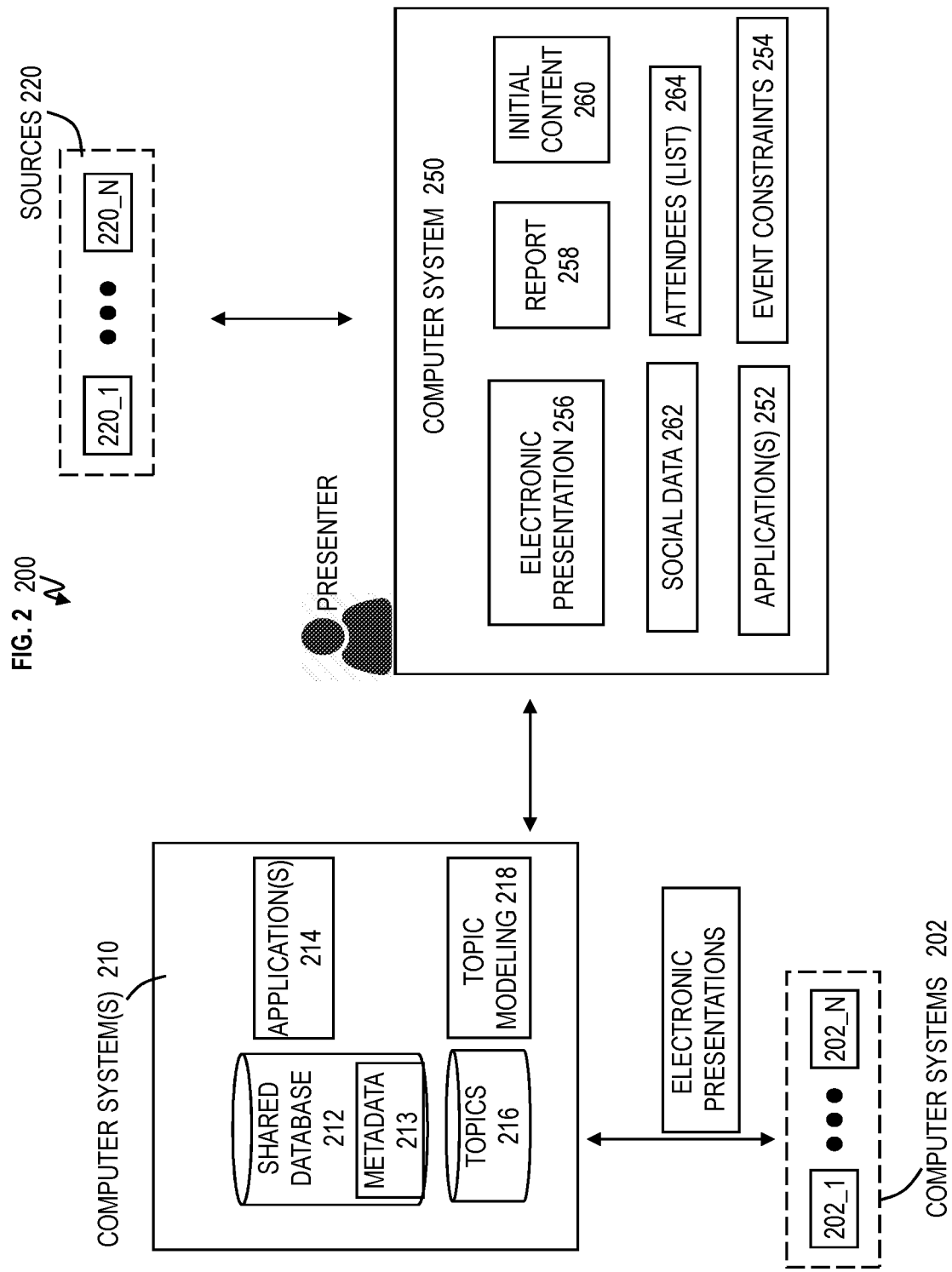
FIG. 2 is a block diagram of an example system for adapting and/or generating an electronic presentation according to audience profiles from social media in accordance with one or more embodiments of the present invention.
Figure 3:
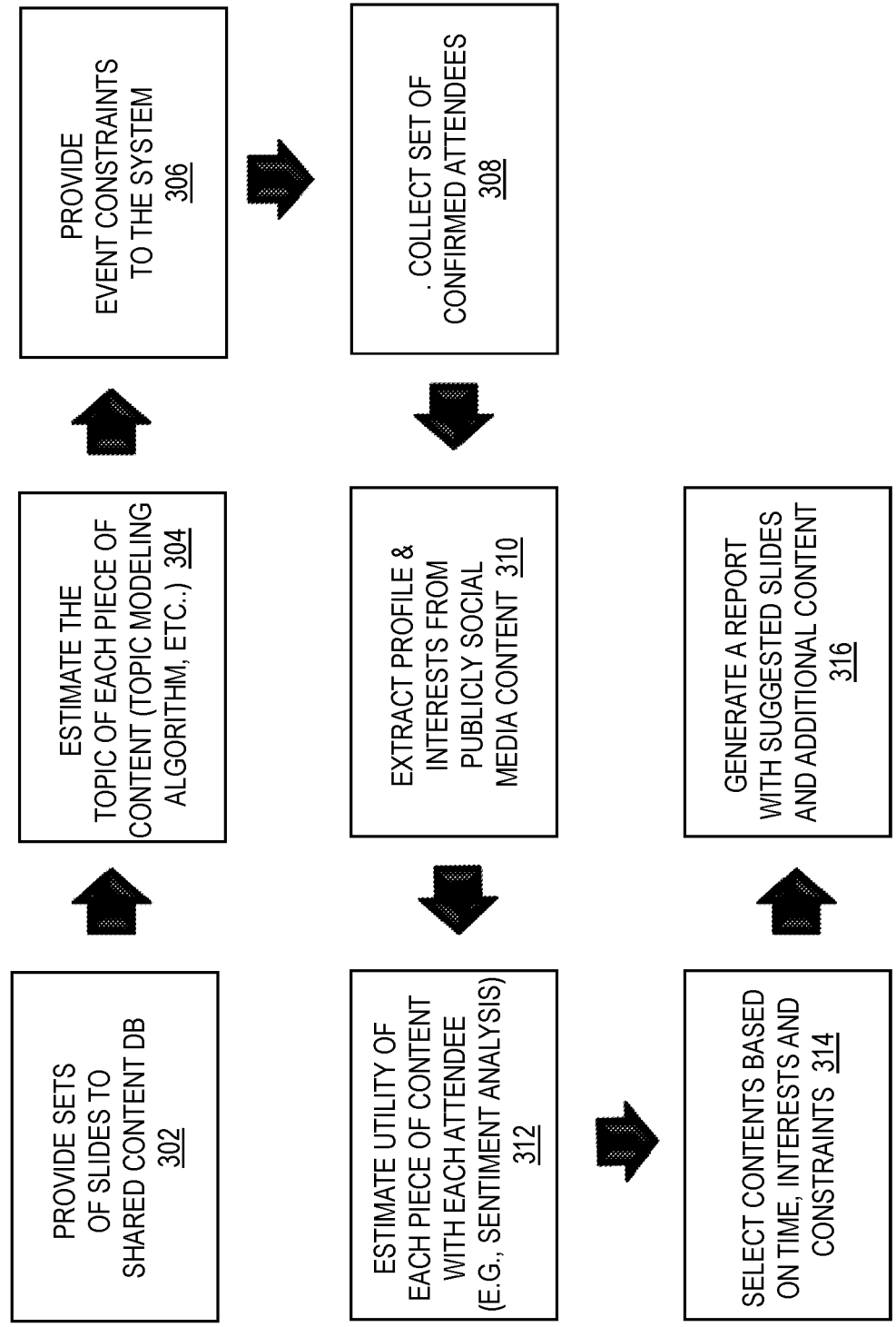
FIG. 3 is a flow diagram of a process for adapting and/or generating an electronic presentation according to audience profiles from social media in accordance with one or more embodiments of the present invention.

FIG. 2 illustrates a block diagram of an example system 200 for adapting and/or generating an electronic presentation according to audience profiles from social media in accordance with one or more embodiments of the present invention. FIG. 3 illustrates a flow diagram of a process 300 for adapting and/or generating an electronic presentation according to audience profiles from social media in accordance with one or more embodiments of the present invention. The process 300 is performed by the system 200.

Hardware and software components, including but not limited to processors 101, system memory 103, ROM 104, RAM 105, software 111, mass storage 110, etc., discussed in computer system 100 are FIG. 1 can be respectively utilized in FIGS. 2 and 3. For example, various computer systems 202, computer system(s) 210, computer system 250, and sources 220 include the hardware and software components of computer system 100.

The process 300 shown in FIG. 3 will now be described with reference to FIG. 3 and the corresponding elements of system 200 (shown in FIG. 2) that performs the process 300. At block 302 of the process 300, various collaborators individually use their computer systems 202_1 through 202_N (e.g., collectively referred to as various computer systems 202) to upload electronic presentations to a shared content database 212 on computer system 210. Electronic presentations include one or more electronic slides (or simply slides) for presentation to an audience. Electronic presentations are usually created in presentation software as understood by one skilled in the art. Presentation software is a computer software package used to show information (e.g., electronic presentations), normally in the form of a slide show. Electronic presentation software mostly includes three major functions: an editor that allows text to be inserted and formatted, a method for inserting and manipulating graphic images, and a slide-show system to display the content on an electronic device such as a computer system. Preparation of electronic presentations about a topic for different audiences is part of the working day of many people across enterprises, academia, etc. Also, a large and heterogeneous amount of content is produced daily in large corporations, which can be stored in the shared content database 212. In addition to the electronic presentations being stored in the shared content database 212, the shared content database 212 stores metadata 213 regarding the stored electronic presentations. The metadata 213 for the electronic presentations can include the estimated time duration for presentation of content (including estimated duration of time to present each of the slides and/or to present each of the electronic presentations), presenter style (e.g., informal, business-oriented, scientific, etc.), content topic, and confidentiality (e.g., which contains information about whether particular presentations are private (e.g., only shared within the entity/company), are public (e.g., can be shared outside of the entity/company), etc.).

The computer system 210, which can be representative of multiple computer systems having a distributed architecture, is configured to receive and store the various electronic presentations from the various computer systems 202. The computer system 210 can have one or more software applications 214 (which can include one or more application programming interfaces (APIs)) that receive, store, and process the various electronic presentations.

At block 304, the software application 214 of computer system 210 is configured to determine/estimate the topic of each of the contents (i.e., each piece of content) of the electronic presentations stored in the shared content database 212. The software application 214 can include the functionality of a topic modeling algorithm 218 and/or can instruct/call a topic modeling algorithm 218 to generate a global set of topics which are stored topics database 216.

At block 306, prior to presentation to an audience, the presenter/host of computer system 250 is desiring to create a new electronic presentation adapted with audience profiles from social media and inputs event constraints 254 using one or more applications 252. The event constraints 254 include initial content 260, such as, e.g., sentences, pictures, slides, etc., from the presenter which can be used in the (future) electronic presentation. The initial content 260 can be part of an existing electronic presentation materials (or slide decks), and the presenter can choose content from the existing electronic presentation materials. Analogous to the metadata 213 in the shared content database 212, the event constraints 254 received by the application 252 from the presenter can include estimated time duration for presentation of content (which can be time duration per electronic slide, time duration for the entire electronic presentation (i.e., start to finish time), etc.), content type (e.g., informal, business-oriented, scientific), content topic, confidentiality, etc. Additionally, the event constraints 254 received by the application 252 from the presenter can include topics that must be presented (e.g., one or more mandatory topics), multimedia equipment available (e.g., projector, speakers, television, computer screen, microphone, etc.) for use by the presenter, etc.

At block 308, the application 252 of computer system 250 is configured to receive and/or collect (confirmed) attendees 264 (i.e., identification of members of audience which are the presentation targets). The presenter can input names of the confirmed attendees 264 in the application 252. Also, in some embodiments of the invention, calendar invitations are sent by the application 252, and the application 252 receives the returned confirmations of confirmed attendees 264.

At block 310, prior to the presentation, the application 252 of computer system 250 is configured to automatically extract attendee profiles and interests for the confirmed attendees 264 using publicly available social data 262, for example, from computer system sources 220, in response to receiving the attendee list of confirmed attendees 264. The social data 262 of attendee profiles and/or interests can include for each individual attendee 264 demographics (e.g., occupation, education, geographical location (if the electronic presentation will be remotely presented), etc.), preferred activities/hobbies, professional experience, interests, etc. Individual computer system sources 220_1 through 220_N are collectively referred to as computer system sources 220. Examples of the computer system sources 220 from which the social data 262 is extracted can include social networks/social media computer system sources (such as posts, likes, shares, etc.), personal blogs/websites computer system sources, automatic public profile websites computer system sources (e.g., business websites, university websites computer system sources, publication websites computer system sources (such as, Google® scholar), etc.

At block 312, the application 252 of computer system 250 is configured to automatically estimate content utility for each piece of initial content 260 (i.e., each topic of the initial content) for each attendee 264 prior to the presentation. Content can be representative of the whole amount of information, while portions/parts of the content can be represented as pieces of content, topics of the content, etc. For each attendee (after extracting and storing the social data 262 for respective attendees), the application 252 is configured to associate sentiment (positive and/or negative) to topics of the initial content 260 based on topic sentiment for each attendee (e.g., using likes and/or dislikes on posts). The application 252 is configured to include and/or utilize a trained topic modeling classifier (like topic modeling algorithm 218 to) to compute topic composition, and then application 252 is configured to associate each of the topics of the initial content 260 to an attendee preference for each topic. For each attendee, the application 252 is configured to compute content utility based on that attendee's sentiment toward a particular topic of the initial content 260, using the social data 262 for that attendee.

For example, the application 252 is configured to automatically determine that a given attendee has positive sentiment from her social data 262 toward different types of subject matter (corresponding topics of the initial content 260), and examples of subject matter can include travel, animals (pets), sports, machinery, fashion, particular technology, etc. Positive sentiment could be likes, positive emojis (such as smiley faces, thumbs up, etc.), positive words/expressions (like, love, happy, glad, enjoy, etc.), etc., in relation to subject matter of extracted social data 262 corresponding topics of the initial content 260. Similarly, the application 252 is configured to determine that a given attendee 264 has negative sentiment from her social data 262 toward different types of subject matter corresponding to topics of the initial content 260, and examples of subject matter can include X, Y, Z. Negative sentiment could be dislikes, negative emojis (such as unhappy faces, sad faces, thumbs down, etc.), negative words/expressions (dislike, unhappy, not glad, sad, etc.), etc., in relation to subject matter of social data 262 corresponding to topics of the initial content 260. The application 252 can include a rule that a positive sentiment is attributed to activities/hobbies, professional experience, interests, etc., for a given attendee 264 even if there are no corresponding topics in the initial content 260.

For each attendee 264, the application 252 is configured to automatically create and store an attendee profile/preference having the positive sentiment with corresponding subject matter, negative sentiment with corresponding subject matter, activities/hobbies, professional experience, interests, etc. The application 252 is configured to match/identify the subject matter (topics) and sentiment (positive and negative sentiment) with the topics of initial content 260. For each attendee 264, the application 252 is configured to compute a content utility for each topic of the initial content 260. The application 252 can compute the content utility as a content utility value for each topic of the initial content 260 per attendee 264. For example, a positive value (e.g., +5) can be given for each positive sentiment expressed by a given attendee for a given topic of the initial content 260 while a negative value (e.g., −5) is given for each negative sentiment expressed by a given attendee for a given topic of the initial content 260. There could be some attendees 264 who have neither a positive sentiment nor negative sentiment (e.g., 0) toward a given topic of the initial content 260 because no expression of sentiment has been provided by those attendees (e.g., the application 252 could not find an expression of sentiment regarding the particular topic). The application 252 is configured to combine all the values (positive and negative) per given topic of the initial content 260 for a given attendee 264, and then determines a content utility value for that given topic of the initial content 260 for that given attendee. In a case where there are 20 topics of the initial content 260 as determined by the application 252, the application 252 is configured to display 20 content utility values per attendee, where one topic corresponds to one utility content value in a content utility value list 400 (depicted in FIG. 4A) for a given attendee 264. FIG. 4A illustrates example content utility value list 400 as a list of topics of the initial content 260 and a corresponding content utility value per topic according to one or more embodiments. Although one example content utility value list 400 is illustrated, it should be appreciated that each attendee 264 has her own content utility value list 400 generated by application 252 based on that individual attendee's positive or negative sentiments.

In one or more embodiments of the invention, the calculus of the content utility could be made by a mean value of the number of mentions of a topic on public previous posts of the audience, which could be addressed by an algorithm. For example, the number of times an attendee mentions a topic in her social data 262 can be identified and summed, and the application 252 is configured to compute the content utility based on that attendee's sentiment for each of the mentions by using the mean value for that particular topic for that attendee.

At block 314, the application 252 of computer system 250 is configured to automatically select content to be inserted into the future electronic presentation 256 for the presenter, prior to presentation of the electronic presentation 256. The application 252 is configured to constrain the electronic presentation 256 according to the event constraints 254 provided by the presenter, along with incorporating the total content utility values for the topics of the initial content 260 and the interests of the attendees 264.

For each topic/piece of content, application 252 can determine the total content utility value (sum of content utility value per topic for all attendees) and a duration time. For example, the application 252 can sum the content utility values from each of the attendees 264 per topic to result in a total content utility value for each of the topics of the initial content 260. After combing the content utility values in the rows in content utility value lists 400 for each attendee 264, each topic of the content now has a total content utility value as depicted in example total content utility values list 450 of FIG. 4B. Accordingly, from the example scenario discussed above, there are 20 total content utility values one for each of the 20 topics. The application 252 can add the individual content utility values per topic from the content utility value list 400 for each attendee, resulting in the total content utility values list 450. Therefore, the value of each topic/piece of initial content 260 can be given by its weight, defined according to its utility to the attendees 264. Additionally, some attendees 264 can be given different weights, reflecting their importance according to presentation targets (e.g., chief executive officer (CEO) has larger weight than chief information officer (CIO) and a much larger weight than regular employees). This means that content utility values per topic in the content utility value list 400 for the CEO attendee can have more weight, such as twice, three times, four times, and/or ten times (or more) as much weight as other attendees scheduled to attend the presentation, and the total content utility value for each topic will reflect the weight applied to the content utility values per topic in content utility value list 400 for the CEO attendee.

The application 252 also estimates a time duration for each topic/piece of content based on the total content utility values. A higher total content utility value for a topic (compared to other topics with lower total content utility values) corresponds to spending more time on that topic, while a lower total content utility value for a topic (compared to other topics with higher total content utility values) corresponds to spending less time (and/or even no time) for that topic.

While being constrained to the event constraints 254, the application 252 is configured to automatically select the best set of slides from the shared content database 212 and/or slides in the initial content 260 provided by the presenter to insert into an electronic presentation 256 for the presenter. The application 252 can utilize and/or incorporate an algorithm to solve the knapsack problem constrained to event constraints. The knapsack problem is a kind of problem where one needs to decide which items he will include in the knapsack, as understood by one skilled in the art. In accordance with embodiments of the invention, application 252 is configured to maximize the total utility value subjected to limitations (event constraints 254) of time, number of slides, etc.

The application 252 can parse and find all the electronic slides in the shared content database 212 having topics in topics database 216 that correspond/match the topics/subject matter of the total content utility values for the attendees 264 in accordance with the total content utility values in the total content utility values list 450. The application 252 might determine a threshold (e.g., 0 or greater) as the cut off for the total content utility value per topic such that any topics not meeting the threshold are not candidates. Accordingly, for topics meeting the threshold requirement, the application 252 is configured to select electronic slides from the shared content database 212 and select electronic slides from the initial content 260 provided by the presenter, in accordance with the event constraints 254. Any topics not meeting the threshold requirement will be omitted such that their corresponding electronic slides are not included in the electronic presentation 256, unless that topic is a requirement in the event constraints 254 in which case the time duration is minimized (e.g., set to the lowest possible time duration) for that topic.

At block 316, the application 252 is configured to automatically generate an electronic report 258 with audience features and recommendations according to the social data 262. The report 258 identifies topics that corresponded to the positive sentiment of the attendees 264 based on the social data 262, and possibly the negative sentiment of the attendees 264. For any topics of slides in the electronic presentation 256 that correspond to a negative sentiment but are required by the event constraints, the application 252 can notify the presenter in the report 258 and/or can add an alert only seen by the presenter to the respective slides in the electronic presentation 256. This alert (which can be icon displayed, a sound, and/or text) notifies the presenter to move quickly through such slides associated with negative sentiment of the attendees 264. Additionally, for including in the report 258, the application 252 is configured to select and/or identify electronic slides in the shared content database 212 which are based on activities/hobbies, professional experience, interests, etc., for attendees 264 even if these activities/hobbies, professional experience, interests, etc., are not covered under the topics in the initial content 260 (e.g., original slide deck), content utility value lists 400, and/or total content utility values list 450. Also, the report 258 lists/identifies activities/hobbies, professional experience, interests, etc., for attendees as suggested additional content. As can be seen, the electronic presentation 256 has been automatically prepared and generated by the application 252 prior to the presentation or the conference, with content that is appealing to the attendees 264 and that contains some of their personal preferences.

FIG. 5 is a flow diagram of a computer-implemented method 500 for selecting electronic slides for and/or generating an electronic presentation in accordance with one or more embodiments of the present invention. The application 252 of computer system 250 is configured to receive initial content 260 and event constraints 254 related to a to-be-delivered communication (e.g., an electronic presentation 256), at block 502. At block 504, the application 252 of computer system 250 is configured to automatically extract information for recipients (e.g., attendees 264) designated to receive the to-be-delivered communication (e.g., attend the electronic presentation 256). At block 506, the application 252 of computer system 250 is configured to automatically determine content utility values for topics (e.g., such as in the content utility value list 400) of the initial content 260 for each of the recipients (e.g., attendees 264), the content utility values for each of the topics being based on the information for each of the recipients (e.g., attendees 264). At block 508, the application 252 of computer system 250 is configured to automatically determine total content utility values (e.g., in total content utility values list 450) for each of the topics in the initial content 260. At block 510, the application 252 of computer system 250 is configured to select elements of the communication (e.g., select electronic slides) from a database (e.g., shared content database 212) (to be utilized in the electronic presentation 256) based at least in part on the total content utility values for the topics and the event constraints 254.

The application 252 of computer system 250 is configured to insert the elements (e.g., electronic slides) into the to-be-delivered communication (e.g., electronic presentation 256). The database (e.g., shared content database 212) includes shared content from various electronic presentations along with metadata 213 of the various electronic presentations. The event constraints 254 are selected from the group consisting of one or more mandatory topics which must be presented in the to-be-delivered communication (e.g., electronic presentation 256), duration of time for completion of the electronic presentation, type of the electronic presentation, and/or multimedia equipment available for the electronic presentation 256.

Extracting information for the recipients (attendees 264) designated to receive the to-be-delivered communication (e.g., attend the electronic presentation 256) includes extracting social data (e.g., from computer system sources 220) for each of the attendees 264 from one or more of social networks, personal blogs, and public websites. Determining the content utility values for the topics of the initial content 260 for each of the recipients (e.g., attendees 264) includes associating a sentiment to the topics for each of the attendees 264 and computing a content value for each topic per attendee 264 based on the sentiment (e.g., content utility value lists 400). Determining the total content utility values (e.g., in total content utility values list 450) for each of the topics in the initial content 260 includes summing content utility values for each of the attendees 264 for each of the topics in the initial content 260. The content utility values for one or more of the attendees 264 are given more weight for each of the topics than other ones of the attendees 264. The one or more of the attendees 264 having the content utility values with more weight have a larger effect in determining the total content utility values for each of the topics. The application 252 of computer system 250 is configured to generate an electronic report 258 including recipient features and recommendations according to the information (e.g., social data 262). Automatically selecting the content (e.g., electronic slides) from the database (e.g., shared content database 212) to be utilized in the electronic presentation 256 based on the total content utility values for the topics and the event constraints 254 includes selecting the electronic slides corresponding to the topics having the total content utility values with higher values over the topics having lower values.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a computer system, initial content and event constraints related to a to-be-delivered communication;
   extracting, by the computer system, information for recipients designated to receive the to-be-delivered communication;
   determining, by the computer system, content utility values for topics of the initial content for each of the recipients, the content utility values for each of the topics being based on the information for each of the recipients;
   determining, by the computer system, total content utility values for each of the topics in the initial content;
   creating an electronic presentation having electronic slides by the computer system automatically selecting elements to include in one or more of the electronic slides from a database based at least in part on the total content utility values for the topics and the event constraints, the to-be-delivered communication comprising the electronic presentation having electronic slides in which the one or more of the electronic slides comprise the elements selected from the database.

2. The computer-implemented method of claim 1 further comprising inserting the elements into the one or more of the electronic slides of the to-be-delivered communication.

3. The computer-implemented method of claim 1, wherein the database comprises shared content from various electronic presentations along with metadata of the various electronic presentations.

4. The computer-implemented method of claim 1, wherein the event constraints are selected from the group consisting of one or more mandatory topics which must be presented in the to-be-delivered communication, duration of time for completion of the to-be-delivered communication, type of the to-be-delivered communication, and multimedia equipment available for the to-be-delivered communication.

5. The computer-implemented method of claim 1, wherein extracting the information for the recipients designated to receive the to-be-delivered communication comprises extracting social data for each of the recipients from one or more of social networks, personal blogs, and public websites.

6. The computer-implemented method of claim 1, wherein determining the content utility values for the topics of the initial content for each of the recipients comprises associating a sentiment to the topics for each of the recipients and computing a content value for each topic per recipient based on the sentiment.

7. The computer-implemented method of claim 1, wherein determining the total content utility values for each of the topics in the initial content comprises summing content utility values for each of the recipients for each of the topics in the initial content.

8. The computer-implemented method of claim 7, wherein:
the content utility values for one or more of the recipients are given more weight for each of the topics than other ones of the recipients; and
the one or more of the recipients having the content utility values with the more weight have a larger effect in determining the total content utility values for each of the topics.

9. The computer-implemented method of claim 1 further comprising generating an electronic report comprising recipient features and recommendations according to the information.

10. The computer-implemented method of claim 1, wherein automatically selecting the elements of the to-be-delivered communication from the database based on the total content utility values for the topics and the event constraints comprises selecting the elements corresponding to the topics having the total content utility values with higher values over the topics having lower values.

11. A system comprising:
a memory having computer readable instructions; and
one or more processors for executing the computer readable instructions, the computer readable instructions controlling the one or more processors to perform operations comprising:
receiving initial content and event constraints related to a to-be-delivered communication;
extracting information for recipients designated to receive the to-be-delivered communication;
determining content utility values for topics of the initial content for each of the recipients, the content utility values for each of the topics being based on the information for each of the recipients;
determining total content utility values for each of the topics in the initial content; and
creating an electronic presentation having electronic slides by automatically selecting elements to include in one or more of the electronic slides from a database based at least in part on the total content utility values for the topics and the event constraints, the to-be-delivered communication comprising the electronic presentation having electronic slides in which one or more of the electronic slides comprise the elements selected from the database.

12. The system of claim 11, wherein the operations further comprise inserting the elements into the to-be-delivered communication.

13. The system of claim 11, wherein the database comprises shared content from various electronic presentations along with metadata of the various electronic presentations.

14. The system of claim 11, wherein the event constraints are selected from the group consisting of one or more mandatory topics which must be presented in the to-be-delivered communication, duration of time for completion of the to-be-delivered communication, type of the to-be-delivered communication, and multimedia equipment available for the to-be-delivered communication.

15. The system of claim 11, wherein extracting the information for the recipients receive the to-be-delivered communication comprises extracting social data for each of the recipients from one or more of social networks, personal blogs, and public websites.

16. The system of claim 11, wherein determining the content utility values for the topics of the initial content for each of the recipients comprises associating a sentiment to the topics for each of the recipients and computing a content value for each topic per recipient based on the sentiment.

17. The system of claim 11, wherein determining the total content utility values for each of the topics in the initial content comprises summing content utility values for each of the recipients for each of the topics in the initial content.

18. The system of claim 17, wherein:
the content utility values for one or more of the recipients are given more weight for each of the topics than other ones of the recipients; and
the one or more of the recipients having the content utility values with the more weight have a larger effect in determining the total content utility values for each of the topics.

19. The system of claim 11, wherein automatically selecting the elements of the to-be-delivered communication from the database based on the total content utility values for the topics and the event constraints comprises selecting the elements corresponding to the topics having the total content utility values with higher values over the topics having lower values.

20. A computer program product comprising a computer readable storage medium having program instructions embodied therewith, the program instructions executable by a processor to cause the processor to perform operations comprising:
receiving initial content and event constraints related to a to-be-delivered communication;
extracting information for recipients designated to receive the to-be-delivered communication;
determining content utility values for topics of the initial content for each of the recipients, the content utility values for each of the topics being based on the information for each of the recipients;
determining total content utility values for each of the topics in the initial content; and
creating an electronic presentation having electronic slides by automatically selecting elements to include in one or more of the electronic slides from a database based at least in part on the total content utility values for the topics and the event constraints, the to-be-delivered communication comprising the electronic presentation having electronic slides in which the one or more of the electronic slides comprise the elements selected from the database.

\* \* \* \* \*